Figure 1:
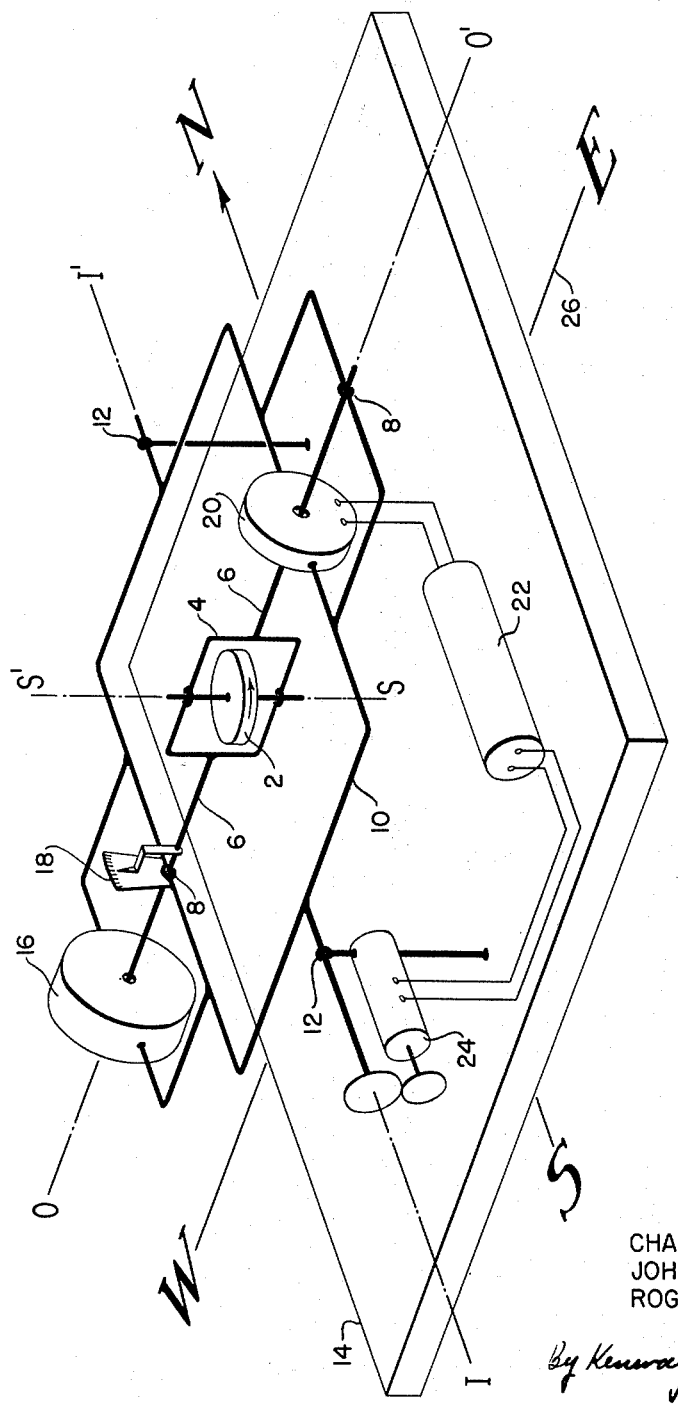

INVENTORS
CHARLES S. DRAPER
JOHN F. HUTZENLAUB
ROGER B. WOODBURY

ATTORNEYS

INVENTORS
CHARLES S. DRAPER
JOHN F. HUTZENLAUB
ROGER B. WOODBURY

By Kenway Jenney Witter
         & Hildreth

ATTORNEYS

July 3, 1956

C. S. DRAPER ET AL 2,752,793

GYROSCOPIC APPARATUS

Filed March 22, 1951

4 Sheets-Sheet 3

INVENTORS
CHARLES S. DRAPER
JOHN F. HUTZENLAUB
ROGER B. WOODBURY

By Kenway Jenney Witter
& Hildreth
ATTORNEYS

July 3, 1956

C. S. DRAPER ET AL 2,752,793

GYROSCOPIC APPARATUS

Filed March 22, 1951

4 Sheets-Sheet 4

INVENTORS
CHARLES S. DRAPER
JOHN F. HUTZENLAUB
ROGER B. WOODBURY

ATTORNEYS

United States Patent Office 2,752,793
Patented July 3, 1956

2,752,793

GYROSCOPIC APPARATUS

Charles S. Draper, Newton, Roger B. Woodbury, Belmont, Mass., and John F. Hutzenlaub, Milwaukee, Wis., assignors, by mesne assignments, to Research Corporation, New York, N. Y., a corporation of New York Application March 22, 1951, Serial No. 216,946

18 Claims. (Cl. 74—5.34)

The present invention relates to gyroscopically controlled apparatus, and is more particularly concerned with apparatus for accurately determining the angular motion of a body about a certain reference axis or axes and controlling the motion of said body in a manner dependent upon said measurement, as, for example, in navigational instruments.

Gyroscopic systems for use in navigational work and for automatic control and steering of ships and aircraft and the like have ordinarily made use of gyros with two degrees of freedom. Such gyros are mounted in gimbals so that the spin axis is capable of assuming substantially any direction in space. A completely free gyro, namely, one without any restraints whatever, has the theoretical property of maintaining its spin axis in a fixed position in inertial space, but because of unavoidable friction and gimbal lock in the supports, this ideal property cannot be realized. Further difficulties are encountered in that correction and compensating torques cannot be applied about the axes about which motion is to occur, but on the contrary, must be put in on other axes so that the gyro can precess to its desired position, usually through a complicated erecting movement.

Another form of gyro instrument is one in which the gyro element has only a single degree of freedom, namely, one in which the gyro can deflect only about a single axis, whereby the position of the gyro in its suspension can be expressed by a single quantity. This type of instrument is usually provided with elastic restraint and has been embodied in devices for measuring instantaneous angular rates, as, for example, in turn indicators for aircraft. Generally the single-degree-of-freedom gyro has not been used for navigational purposes, where a reference to inertial space or to the earth's surface is required, since it has been assumed that such references can be maintained only with gyros having multiple degrees of freedom; in other words, the multiple-degree-of-freedom gyro has been generally considered as sensitive to changes of position, while the single-degree-of-freedom gyro has generally been considered only as a rate-sensitive device.

It is the object of the present invention to provide gyroscopically controlled navigational apparatus in which only single-degree-of-freedom gyros are used. As will be pointed out hereinafter, such apparatus may take the form of stable verticals or horizons, auto pilots, devices for maintaining fixed positions in inertial space, etc.

In furtherance of the foregoing and other objects as will hereinafter appear, the present invention utilizes a so-called "integrating gyro," namely a single-degree-of-freedom gyro (capable of deflecting in its suspension about a single axis only, here termed the "output" axis), the gyro being entirely free of elastic restraint about the output axis, and having means for generating a resisting or restraining torque proportional to the rate of deflection about said axis. The restraining torque is preferably generated by a viscous damping member. As will be shown in the subsequent development of the theory, the gyro is not expected to deflect from a neutral position more than a few degrees. Gyroscopic apparatus of that type is described in the Bentley and Draper application, Serial No. 489,566, filed June 3, 1943. The characteristics of the integrating gyro are such that the relation between the angular velocity of the unit and the output torque is a very simple one, as follows:

$$T = H\omega$$

where T is the torque, H is the angular momentum of the wheel, and ω is the "input" angular velocity of the unit, namely, the angular velocity about an axis perpendicular both to the spin axis and to the output axis. Since there is no elastic restraint on the output axis and the only restraint is due to damping, the resisting torque is proportional to the rate of deflection about the output axis. When the gyro reaches equilibrium, these two torques may be equated. Under such conditions, the two rates of deflection are proportional. The actual instantaneous deflections are the integrals of the rates, and they also are proportional. Hence the gyro is termed an integrating gyro, since the output deflection is proportional to the time-integral of ω, that is, to the total input angle.

The principal feature of the invention comprises the combination of the integrating gyro as described above, together with servo means operating on the controlled element, said servo means being actuated by an instantaneous deflection of the gyro and having its output connected to the controlled element in a manner to tend to restore the gyro to its neutral position. By this arrangement, the gyro is called upon to deliver energy at only a signal level, while the energy required for moving the controlled member supports against inertia and friction is furnished by the servomechanism. Since the gyro is never required to deflect in its suspension by more than a very small angle from its neutral position, effects due to "coupling," gimbal lock, and other inherent difficulties of the two-degree-of-freedom gyro are avoided.

When the integrating gyro assembly of the present invention is used without control torques, it will hold a reference to inertial space (that is, space in which Newton's laws of mechanics are valid; for practical purposes, the celestial space established by the "fixed" stars). Furthermore, by the introduction of reference or control torques on the gyro, as described in general in the above-mentioned Bentley and Draper application, referred to therein as "bias" torques, and as particularly described in the copending application of Charles S. Draper and Roger B. Woodbury, Serial No. 216,947, filed March 22, 1951, a fixed position with respect to the earth's surface may be maintained and hence a stable vertical line or a stable horizontal plane may be maintained. The accuracy of such a line or plane may be carried to an extreme, namely, of the order of a few minutes of angle. This is to be distinguished from free gyros of the spinning top variety, which, while theoretically capable of maintaining a true horizontal plane can do so only for short periods and then with inferior precision. An important aspect of the present invention is that the assembly lends itself readily to the application of reference or control torques to the output axis itself; thus, for example, a gravity reference may be provided by a simple pendulous device connected electrically to introduce a torque about the output axis.

Figure 2:
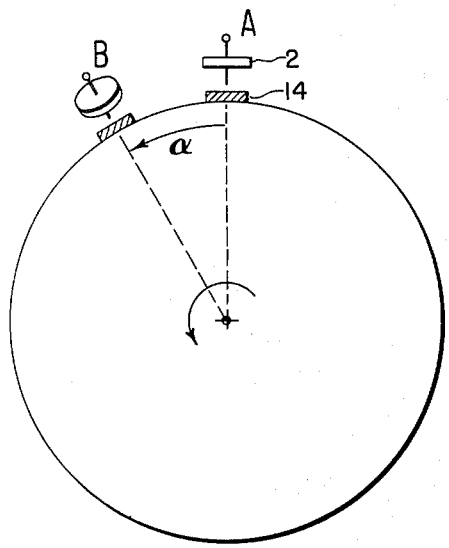
Figure 3:
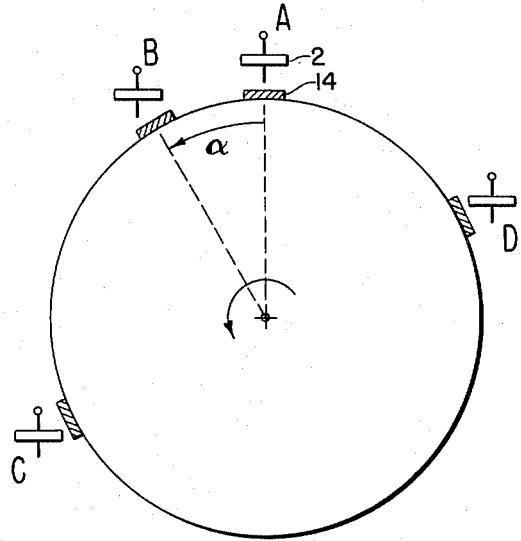
Figure 4:
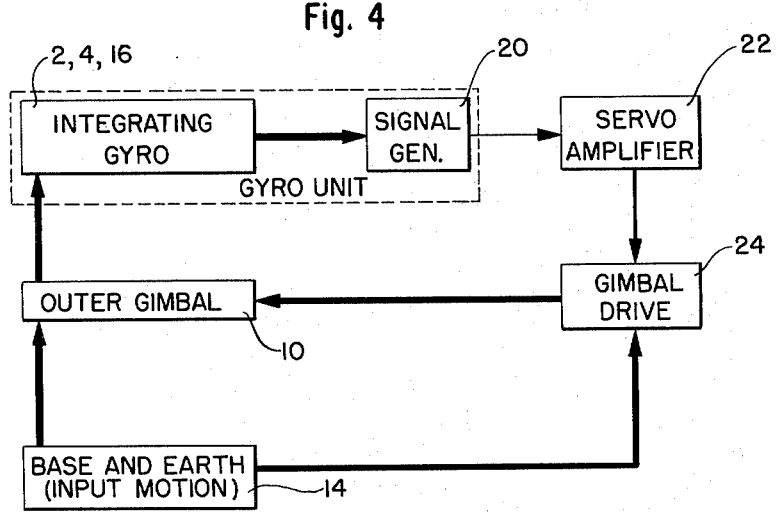
Figure 5:
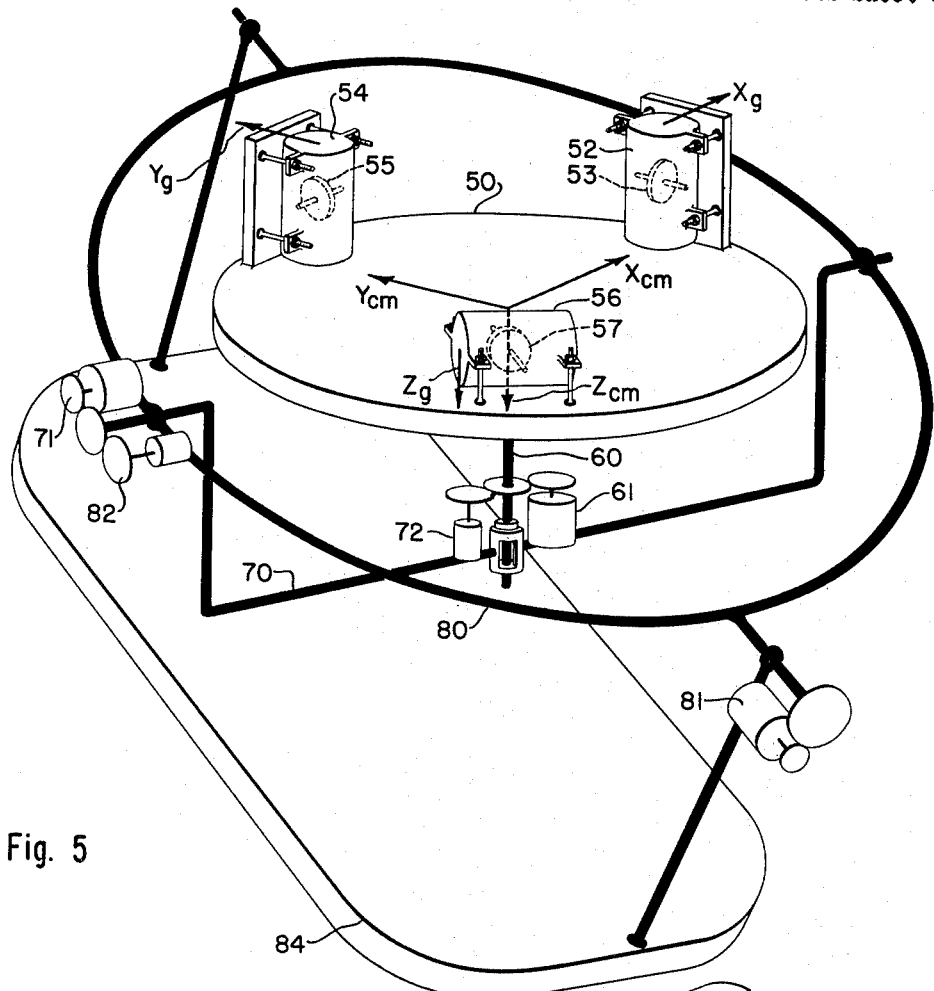
Figure 7:
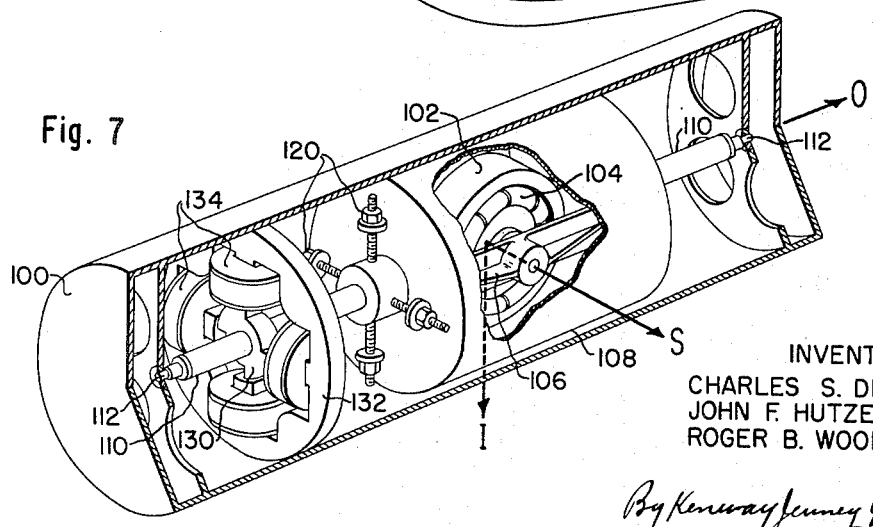
Figure 6:
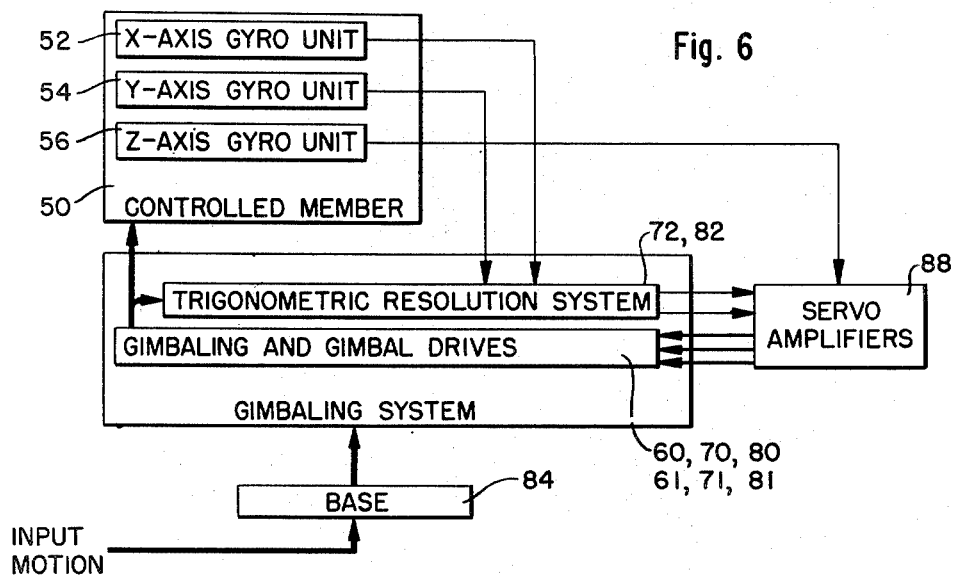
Figure 8:
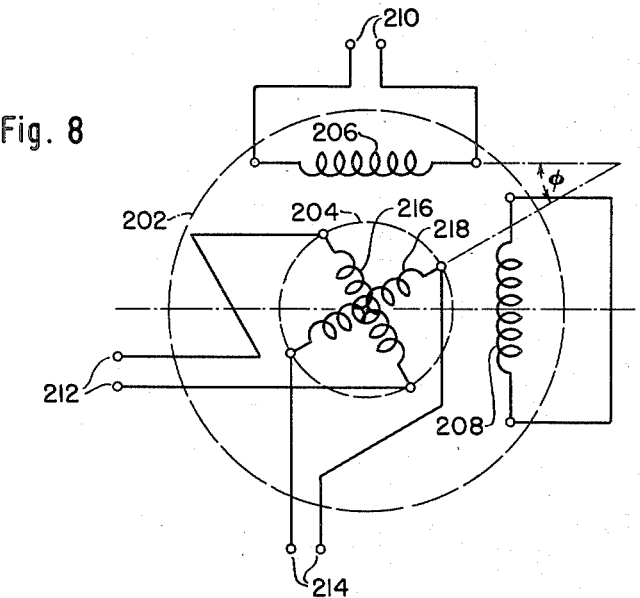

In the accompanying drawings which show a preferred embodiment of our invention, Fig. 1 is a schematic drawing of a single-degree-of-freedom gyro unit to illustrate the principles of the present invention; Figs. 2 and 3 are diagrams illustrating the properties of the unit of Fig. 1; Fig. 4 is a block diagram showing the interrelation of the parts of Fig. 1; Fig. 5 is a schematic drawing of the configuration used to stabilize a controlled member in inertial space; Fig. 6 is a block diagram showing the interrelation of the components of Fig. 5; Fig. 7 is a view of one of the gyro units used in the preferred embodiments; Fig. 8 is a schematic drawing of one of the angle resolvers.

The basic operational features of the present invention are first described by considering a highly simplified example, for which reference may be made to Figs. 1 to 4. In Fig. 1 a gyro rotor 2 is mounted in an inner gimbal 4 which is mounted on shafts 6 free to rotate in bearings 8 in an outer gimbal 10. The outer gimbal is journaled in bearings 12 fixed on a base 14. The spin axis of the rotor is indicated at SS' and the axis through the bearings 12 or the "input" axis at II'. The output axis OO' is through the bearings 8. A viscous damping member 16 is carried by one of the shafts 6 consisting of a member free to turn in a liquid-filled case carried by the outer gimbal. A dial 18, carried by the outer gimbal, may be used to indicate deflections of the gyro and inner gimbal with respect to the outer gimbal.

The outer gimbal 10, in this example, is the controlled element and is to be servo-operated in such a way that the gyro deflection, as measured on the dial 18 will be held at zero, or nearly so. To that end, the output axis carries a pick-off or electrical sensing device shown generally at 20, which is capable of generating an electrical signal proportional to the deflection of the gyro from its zero position. The pick-off is preferably of the type described in the U. S. Patent 2,488,734 of Mueller, issued November 22, 1949, and is not here described in detail. The electrical output of the device 20 is passed through a suitable amplifier 22 for operation of a servomotor 24 which is connected by suitable gearing with the outer gimbal 10 at the input axis II'. These components are arranged so that any motion of the gyro about the output axis causes the servomotor to act on the input axis of the controlled element in a direction such that the gyro is caused to be brought toward its neutral position. Thus, a feedback loop is set up which always seeks the null point of the gyro unit.

To show the operation of the system as a highly simplified navigational instrument, consider the special case where it is mounted at the equator 26 in the initial position shown in Fig. 1, namely, with the spin axis SS' vertical, the input axis II' north-and-south (in a plane including the earth's axis) and the output axis in the plane of the equator and hence pointing east-and-west.

Due to the earth's rotation at an angular rate $$\frac{d\alpha}{dt}$$

the gyro will generate an output torque T about its output axis tending to rotate the gyro in its mounting:

(1) $$T = H\frac{d\alpha}{dt}$$

where H is the angular momentum of the rotor. Assuming that inertial torque about the output axis is negligible, the only torque resisting the torque T is that generated by the viscous damping fluid, (2) $$T_d = c\frac{d\theta}{dt}$$

where $\theta$ is the deflection of the gyro in its mount (as measured, for example on the dial 18) and c is the damping constant. When these two balance, that is, when the gyro is in equilibrium, $$H\frac{d\alpha}{dt} = c\frac{d\theta}{dt}$$

Upon integrating, $$\theta = \frac{H}{c}\alpha$$

which means the gyro output deflection is proportional to the gyro input deflection.

Fig. 2 is a diagram of the earth looking down from the north pole, with the instrument at initial position A on the equator. If the servo means were not present, after the earth turned through an angle $\alpha$, the gyro would have turned in its mount through an angle $\theta$ about its output axis OO' as shown at B. However, the gimbal 4 is not permitted to turn through any substantial angle, because as soon as the pick-off senses a differential deflection angle, the servomotor 24 is actuated to turn the controlled member, namely the outer gimbal 10, through a small angle about the input Axis II' just sufficient to restore the gyro to substantially its null position. The result of these operations is that no substantial deflection of the gyro in its mount is allowed to materialize, and the only motion is that about the input axis II', which motion is always precisely the right amount to maintain the pick-off voltage at or very near a null value. As a result, as shown in Fig. 3, while the base 14 partakes of the motion of the earth, the spin axis SS' (and, therefore, the controlled member 10) maintains a fixed position in inertial space, as indicated for successive angular positions A, B, C, D in Fig. 3.

The extent to which the gyro is permitted to deflect about the output axis OO' is a function of the sensitivity of the pick-off and servo system. The pick-off of the type described in the above-mentioned Mueller patent is sensitive to deflections which are of the order of a second of arc, which means that with an adequately precise servo drive the direction of the spin axis SS' may be maintained with exceptional accuracy. The only other important source of error is the "drift" of the gyros themselves, due to random friction torques, but it has been found that the net drift is reduced to the order of one minute of arc in a period as long as ten hours of operation.

Fig. 4 is a block diagram of the mechanical and electrical interrelation of the various parts of Fig. 1. Rigid mechanical connections are shown by heavy lines, connections at power level by medium lines, and signal level relations by light lines. The base is shown at 14 and is essentially the input motion to the loop. By virtue of the servo connection between the base and the outer gimbal 10, motion of the base is transmitted to the outer gimbal as if by a semi-rigid mechanical connection. Motion of the gimbal 10 is impressed directly on the integrating gyro assembly, and causes a precession which is transmitted by a rigid connection to the signal generator 20. Now the input motion is converted to an electric signal and raised to power level by the amplifier 22. This runs the servomotor gimbal drive 24 which is rigidly connected to the outer gimbal 10. The entire assembly is a negative feedback loop in which the input motion, introduced at 14, is detected and converted by the gyro unit to a signal which activates means to nullify the input.

The apparatus shown in Fig. 1 is highly idealized for purposes of explanation, since a single gyro unit with one degree of freedom is capable of maintaining a fixed position in inertial space only under artificial conditions like those specified above. (In general, two single-degree-of-freedom gyros are necessary to maintain a fixed direction in inertial space and three such gyros to maintain a fixed set of coordinates.) An instrument by which such a direction may be maintained, regardless of initial orientation or position of the instrument on the earth's surface, is shown in Fig. 5.

Fig. 5 shows three gyroscopic units 52, 54, 56 for the X-, Y- and Z- axes, respectively, mounted on a table 50 which is here considered the "stabilized member." The gyro rotors are indicated at 53, 55 and 57. The stabilized member 50 rests on an inner gimbal or shaft 60, driven by a drive motor 61. The inner gimbal assembly is supported by the middle gimbal 70 which is controlled by its angle resolver 72 and drive motor 71, all held in turn by the outer gimbal 80 controlled by its angle resolver 82 with its drive motor 81. The outer gimbal assembly rests on a base 84 which is attached through shock absorbers to the vehicle being guided.

Holding the controlled member 50 fixed in inertial space may be thought of as isolating the member from all rotational motion of its base and vehicle in inertial space. Toward this end, the base 84 (Fig. 5) is mounted on the vehicle by conventional shock-absorbing means so as to isolate the base and all it carries from high-frequency motion of the vehicle. The present stabilization system may be thought of as a method of isolating the controlled member from low-frequency motion of the vehicle. The frequency response of the servo-gyro closed loop shown in Fig. 4 preferably begins to cut off at about 20 C. P. S. Hence, it isolates the table 50 from all motion of the vehicle of lesser frequency.

Another way of considering the operation of the stabilizing action is to regard the controlled member 50 as a disk of considerable moment of inertia mounted in perfect, frictionless gimbals. In such a case the member would always stay fixed in space, its gimbals isolating it from vehicle motion. The present invention accomplishes this result with realizable equipment, by the combination of servo drivers to aid the inertial forces on the member tending to keep it fixed in space, together with gyro detectors to determine the necessary amount of servo power.

Fig. 7 shows in detail the preferred form of gyro unit such as used at 52, 54 or 56. The unit is more fully described in the copending application of Jarosh, Haskell and Dunnell, Serial No. 210,246, filed February 9, 1951, and will be only briefly described here. It consists of two parts, a signal generator and a gyroscope, mounted in a case 100. The gyroscope as shown, consists of a rotor 102 driven as a synchronous motor about its stator 104 and supported in an inner member 106. The gyro assembly is contained in a float 108. The inner member 106 corresponds to the inner gimbal 4 of Fig. 1 and is mounted on the shaft 110 in bearings 112 so that it can rotate with respect to the case 100 (which itself corresponds to the outer gimbal 10 of Fig. 1). Inner member rotations with respect to the case are resisted by a damping action (like that provided by the member 16 of Fig. 1). The float 108 is spaced from the case 100 so that there is only a narrow clearance. The entire case is filled with a viscous damping fluid, so that rotations of the inner member are resisted by viscous friction on the float. It should be noted that (except for the bearing friction which is to be minimized) the viscous damping force is the only force continuously resisting gyro deflection. Balance nuts 120 are provided to compensate for any unbalance in the gyro assembly. The spin, input and output axes of the gyro assembly are shown at S, I and O respectively.

The signal generator consists of a rotor 130 attached to the shaft 110 surrounded by a stator 132 and windings 134. The signal generator is preferably of the type described in the above mentioned patent to Mueller. Such a signal generator produces a signal proportional to the deflection of the rotor with respect to the stator and therefore, in the gyro unit, produces a signal proportional to the precessional deflection of the gyro assembly about the output axis O.

To describe the operation of the invention, let it be assumed that a sudden turn of the vehicle carries the controlled member 50 out of alignment with its previous position in inertial space. Comparing Fig. 5 with Fig. 7, it will be noted that the input axes of the three gyro units (denoted in Fig. 5 by the arrows $X_g$, $Y_g$, $Z_g$) form a set of coordinates. One may also imagine a corresponding set of coordinates $X_{cm}$, $Y_{cm}$, $Z_{cm}$, defined by the planes of the controlled member 50 and initially parallel to the axes $X_g$, $Y_g$, $Z_g$. If the servo drives did not correct for it, when the vehicle made a sudden turn in inertial space, the controlled member 50 would tend to be turned because of the coupling (by friction and gear and gimbal inertia) through the servo drives between the member 50 and the base 84.

Assume that there was an angular rotation $\alpha$ about the $X_{cm}$ axis, and that the servo drivers are disconnected. (It should be noted that rotation about the $X_{cm}$ axis produces output only in the X-gyro, while rotations about the $Y_{cm}$ and $Z_{cm}$ axes produce output only from the Y- and Z-gyros, respectively. Thus the change in position of the controlled member 50 is resolved by the three gyros into rotational components about three orthogonal axes. It is therefore mathematically and mechanically possible and proper to consider the three gyros separately.) The X-gyro 52 is now in the same condition that the gyro of Figs. 1–4 was after the earth rotated through an angle $\alpha$, and the X-gyro will also deflect an angle $\theta$ (proportional to the angle of displacement $\alpha$ of the controlled member about the $X_{cm}$ axis). So also will the Y- and Z-axis gyros 54 and 56 deflect proportionally for their respective input displacements.

Fig. 6, the block diagram, shows the same components with the servo amplifiers 88 added and illustrates their electrical and mechanical interrelation. Heavy lines indicate rigid mechanical connections; medium lines show mechanical or electrical connections at the power level; light lines show signal level connections.

These gyro displacements are converted by the signal generators in the gyro units to electric outputs, whose amplitude is proportional to the angular deflection of the gyro. The block diagram of Fig. 6 shows these electrical outputs as light lines running from the gyro units 52, 54, and 56 to the trigonometric resolution system and servo amplifiers. Trigonometric resolution is necessary because the angular deviations measured by the gyros about the controlled member axes $X_{cm}$ and $Y_{cm}$ must be converted to deviations about the gimbal axes. Note that this is not necessary in the case of $Z_{cm}$ because the $Z_{cm}$ axis is identical with the inner gimbal axis.

An angle resolver is shown schematically in Fig. 8. Physically, it resembles a small induction motor. The device comprises a stator 202 and rotor 204, each bearing windings in quadrature. The input voltage, or reference voltage, is applied to the terminals 210 causing a proportional flux in the winding 206. The other stator winding 208 is short-circuited. The flux in the winding 206 induces a voltage in the rotor windings 216 and 218. It can be seen from the geometry of the configuration that the flux linking the coils 218 and 206 will depend on the cosine of the angle $\phi$ between them. Hence, the output voltage across the terminal 214 will be proportional to the input voltage across the terminals 210 and the cosine of the rotorstator angle $\phi$. Similarly the voltage across the terminals 212 will be proportional to the sine of $\phi$.

The resolver 72 receives the rotation of the inner gimbal 60 on its shaft and generates the appropriate trigonometric function, as described above, to correct the middle gimbal drive 71 for the position of the inner gimbal 60. Similarly, the resolver 82 generates the proper function to correct the outer gimbal drive 81 for the positions of both the inner gimbal 60 and middle gimbal 70. It is sensitive to both because the output of the resolver 72 is used as the input voltage to the resolver 82. The positions of the two resolvers are substantially as noted in Fig. 5. The amplifiers 88 (Fig. 6) are provided to raise the level of the voltage from the gyros and resolvers from signal level to power level and to correct phase lags; in general, these will introduce phase leads without integration in accord with well-known servo techniques to insure stability.

If now the servo drive motors are re-connected, they will be activated by this output and shift the position of the controlled member in a way that nullifies the deviation of the controlled member from the controlled member axes $X_{cm}$, $Y_{cm}$, $Z_{cm}$, which, in effect, nullifies their own voltage input and thus, they hold the controlled member 50 in a position fixed in inertial space as "remembered" by the gyros 52, 54, and 56.

An inspection of Fig. 6 will show that the arrangement of Fig. 5, seemingly far more complicated than that of Fig. 1, is, in essence, a combination of three of the Fig. 4 type circuits all based on one stabilized member. Each gyro forms a feedback loop with its associated driver, as shown in Fig. 4. Furthermore, Fig. 6 shows that each of these three loops is a separate channel, except for the corrections for the positions of the gimbals with respect to each other, introduced by the trigonometric resolvers.

In practice, the damping supplied by the fluid between the float 108 and case 100 has been held at a small value, and the time constant of the gyro is of the order of .002 second. Bearing friction has been held to a minimum so that substantially the only force continuously resisting gyro deflections will be the viscous damping force. The resonant frequency of the whole loop is made 20 C. P. S., large enough so that the system does not respond to propeller vibrations, and so inertial torques of the gyro are negligible but small enough so that the controlled member transient deviation is never more than a fraction of a minute of arc. Even though the distance between the float and the case is only a few thousandths of an inch, the fluid 108 also has a buoyant action on the rotor float 108 which removes virtually all of the load on the bearing supporting the shaft of the rotor float and the two microsyn rotors, as described in the copending application of Jarosh, Haskell and Dunnell.

It should also be noted that two gyros would have been enough to maintain the controlled member in a fixed plane. The Z-gyro only maintains a fixed direction within that plane.

Stabilization to a direction (with two gyros) is the exact equivalent, for navigational purposes, of a star sight, so that comparison of the inertial space reference with the direction of the vertical during movement over the earth's surface will give position information. In the alternative such a reference may be used to guide an automatic star-tracking device during periods when the star is obscured. If the reference to inertial space is the polar axis of the earth, the controlled member becomes a north-indicating device.

The apparatus described herein can be used to hold any reference axis, whether or not it is fixed in inertial space. For reference axes which are not fixed in inertial space, a control torque is applied to the output axis of the gyro and means must be supplied for detecting deviations from the reference axis. The application of control torques for the purpose of maintaining a reference axis other than one fixed in inertial space, constitutes the invention of Draper and Woodbury as described in the above-mentioned application Serial No. 216,947 and will not be further described herein.

Having thus described our invention, we claim:

1. Gyroscopic apparatus comprising a gyroscope sensitive to rotation about an input axis perpendicular to the spin axis, means for mounting the gyroscope with a single degree of freedom about an output axis perpendicular to both the spin axis and the input axis, whereby an output torque proportional to the instantaneous angular velocity of rotation about the input axis is generated, means for continuously generating a torque resisting the output torque and proportional to the instantaneous rate of angular motion of the gyroscope about said output axis and independent of the amount of output motion, a controlled member, a mounting for the gyroscope on the controlled member, means defining a null position for the gyroscope about the output axis with respect to the controlled member, servo means operated by an angular deflection of the gyroscope about the output axis from said null position, and connections from the servo means acting on the controlled member to move the latter toward a position in which the gyroscope assumes its null position with respect to the controlled member.

2. Gyroscopic apparatus comprising a gyroscope sensitive to rotation about an input axis perpendicular to the spin axis, means for mounting the gyroscope with a single degree of freedom about an output axis perpendicular to both the spin axis and the input axis, whereby an output torque proportional to the instantaneous angular velocity of rotation about the input axis is generated, a viscous damping member operative on the output axis to produce a resisting torque said resisting torque being substantially the only torque continuously resisting the output rotations, a controlled member, a mounting for the gyroscope on the controlled member, means defining a null position for the gyroscope about the output axis with respect to the controlled member, servo means operated by an angular deflection of the gyroscope about the output axis from said null position, and connections from the servo means acting on the controlled member to move the latter toward a position in which the gyroscope assumes its null position with respect to the controlled member.

3. Gyroscopic apparatus comprising two single-degree-of-freedom gyroscopes mounted with their spin axes angularly displaced from each other, each gyroscope having an input axis and an output axis, means for applying about the output axis of each gyroscope a torque continuously resisting rotations of the gyroscope and proportional to the angular velocity of such rotations, and independent of the amount of such rotations, said gyroscope being free of elastic restraint about its output axis, a controlled member on which the gyroscopes are mounted, and means responsive to motions of the gyroscopes with respect to the controlled member to move the controlled member toward a position in which the gyroscopes are undeflected with respect to the controlled member.

4. Gyroscopic apparatus comprising two single-degree-of-freedom gyroscopes mounted with their spin axes angularly displaced from each other, each gyroscope having an input axis and an output axis, means for applying about the output axis of each gyroscope a torque proportional to the angular velocity of such axis, a controlled member on which the gyroscopes are mounted, means for mounting the controlled member for motion about two axes, means responsive to motions of the gyroscopes with respect to the controlled member to move the controlled member about its axes toward a position in which the gyroscopes are undeflected with respect to the controlled member, said last-named means including angle resolving devices to apply appropriate components of motion to the controlled member.

5. Gyroscopic apparatus comprising two single-degree-of-freedom gyroscopes mounted with their spin axes angularly displaced from each other, each gyroscope having an input axis and an output axis, means for applying about the output axis of each gyroscope a torque proportional to the angular velocity of such axis and independent of the amount of output axis rotation, a controlled member on which the gyroscopes are mounted, means defining a null position of each gyroscope with respect to the controlled member and detecting deviations of the gyroscopes from their null positions, means for mounting the controlled member for motion about two axes and means responsive to deviations of the gyroscopes with respect to the controlled member to rotate the controlled member about said axes toward a position in which the gyroscopes are in their null positions, said last-named means including angle resolving devices to apply appropriate components of motion to the controlled member.

6. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and ouput axes, means for continuously generating a torque resisting said output torque and of a magnitude substantially porportional to the angular velocity of rotation of the output axis and independent of the amount of output axis rotation, a controlled member on which the gyroscope is mounted, means for rotating the controlled member, and means responsive to deflections of the gyroscope relative to the controlled member to activate said rotating means to rotate the controlled member toward a position in which the gyroscope is undeflected with respect to the controlled member.

7. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, viscous damping means for continuously generating a torque resisting said output torque and of a magnitude proportional to the angular velocity of rotation of the output axis and independent of the amount of output axis rotation, a controlled member on which the gyroscope is mounted, means for rotating the controlled member, and means responsive to deflections of the gyroscope relative to the controlled member to activate said rotating means to rotate the controlled member toward a position in which the gyroscope is undeflected with respect to the controlled member.

8. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for continuously generating a torque resisting said output torque and of a magnitude substantially proportional to the angular velocity of rotation of the output axis and independent of the amount of output axis rotation, a controlled member on which the gyroscope is mounted, signal generating means to produce an electric signal dependent on deflections of the output axis, and servo means actuated in response to the signal generating means to rotate the controlled member toward a position in which the gyroscope is undeflected.

9. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for continuously generating a torque resisting said output torque and of a magnitude substantially proportional to the angular velocity of rotation of the output axis and independent of the amount of output axis rotation, a controlled member on which the gyroscope is mounted, gimbal supports for the controlled member, servo means to rotate the gimbal supports of the controlled member, signal generating means to produce a signal dependent on output deflections of the gyroscope, and connecting circuits causing said signal to activate the servo means to rotate the controlled member toward a position in which the gyroscope is undeflected, with respect to the controlled member.

10. Gyroscopic apparatus comprising two gyroscopes, means for mounting each gyroscope with a single degree of freedom about an output axis perpendicular to its spin axis, whereby an output torque about the output axis is generated by an instantaneous angular velocity of rotation about an input axis perpendicular to the spin and output axes, means for continuously generating in each gyroscope a torque resisting output rotations substantially proportional to rate of output rotation and independent of the amount of such rotation, said gyroscope being free of elastic restraint about its output axis, a controlled member on which the two gyroscopes are mounted so that their input axes define a direction in space, means for rotating the controlled member about two axes, and means responsive to output rotation of the gyroscopes to activate the rotating means to rotate the controlled member toward a position in which the gyroscopes are undeflected with respect to the controlled member.

11. Gyroscopic apparatus comprising three gyroscopes, means for mounting each gyroscope with a single degree of freedom about an output axis perpendicular to its spin axis, whereby a precessional torque about the output axis is generated by an instantaneous angular velocity of rotation about an input axis perpendicular to the spin and output axes, means for continuously generating in each gyroscope a torque resisting output rotations substantially proportional to rate of output rotation and independent of the amount of such rotation, said gyroscope being free of elastic restraint about its output axis, a controlled member on which the three gyroscopes are mounted so that their input axes define an orientation in space, means for rotating the controlled member about three axes, and means responsive to output rotations of the gyroscopes to activate the rotating means to rotate the controlled member toward a position in which the gyroscopes are undeflected with respect to the controlled member.

12. Gyroscopic apparatus comprising three gyroscopes, means for mounting each gyroscope with a single degree of freedom about an output axis perpendicular to its spin axis, whereby an output torque about the output axis is generated by an instantaneous angular velocity of rotation about an input axis perpendicular to the spin and output axes, means for continuously generating in each gyroscope a torque resisting output rotations substantially proportional to rate of output rotation and independent of the amount of such rotation, said gyroscope being free of elastic restraint about its output axis, a controlled member on which the gyroscopes are mounted so that their input axes define an orientation in space, gimbals supporting the controlled member to give it three degrees of rotational freedom, servo means for rotating said gimbals, signal generating means for producing three signals dependent on the deflections of the gyroscopes, and connecting circuits for the signals to activate the servo means to rotate the controlled member toward a position in which all the gyros are undeflected with respect to the controlled member.

13. Gyroscopic apparatus comprising a controlled member, a plurality of gyroscopes, means for mounting said gyroscopes on the member, each with a single degree of freedom about an output axis perpendicular to the spin axis, whereby an output torque tending to deflect the gyroscope is generated by an instantaneous angular velocity of rotation about an input axis perpendicular to the spin and output axes, means for resisting gyroscope deflections such that the total torque continuously resisting an output torque is substantially proportional to the rate of deflection, means for rotating the controlled member about the input axes of the gyroscopes, and means responsive to gyroscope deflections to activate said rotating means to move the controlled member to a position in which all the gyroscopes are substantially undeflected with respect to the controlled member.

14. Gyroscopic apparatus comprising a controlled member, a plurality of gyroscopes, means for mounting said gyroscopes on the member, each with a single degree of freedom about an output axis perpendicular to the spin axis whereby an output torque tending to deflect the gyroscope is generated by an instantaneous angular velocity of rotation about an input axis perpendicular to the spin and output axes, means for continuously resisting gyroscope deflections by torques substantially proportional to the rates of deflection and sufficiently large so that all other torques continually resisting gyroscope deflections are negligibly small with respect thereto, means for rotating the controlled member about the input axes of the gyroscopes, and means responsive to gyroscope deflections to activate said rotating means to move the controlled member to a position in which all the gyroscopes are substantially undeflected with respect to the controlled member.

15. Gyroscopic apparatus comprising a controlled member, a plurality of gyroscopes, means for mounting said gyroscopes on the member, each with a single degree of freedom about an output axis perpendicular to the spin axis, whereby an output torque tending to deflect the gyroscope is generated by an instantaneous angular velocity of rotation about an input axis perpendicular to the spin and output axes, viscous damping means continuously resisting gyroscope deflections by torques such that all other torques continuously resisting gyroscope deflections are negligibly small with respect thereto, means for rotating the controlled member about the input axes of the gyroscopes, and means responsive to gyroscope deflections to activate said rotating means to move the controlled member to a position in which all the gyroscopes are substantially undeflected with respect to the controlled member.

16. Gyroscopic apparatus comprising a controlled member, a plurality of gyroscopes, means for mounting said gyroscopes on the member, each with a single degree of freedom about an output axis perpendicular to the spin axis, whereby an output torque tending to deflect the gyroscope is generated by an instantaneous angular velocity of rotation about an input axis perpendicular to the spin and output axes, means for resisting gyroscope deflections such that the total torque continuously resisting an output torque is substantially proportional to the rate of deflection, means for rotating the controlled member about the input axes of the gyroscopes, and means responsive to gyroscope deflections to activate said rotating means to move the controlled member to a position in which all the gyroscopes are substantially undeflected with respect to the controlled member, said activating means including angle resolving means to apply appropriate components of motion to the controlled member.

17. Gyroscopic apparatus comprising a controlled member, a plurality of gyroscopes, means for mounting said gyroscopes, means for mounting said gyroscopes on the member, each with a single degree of freedom about an output axis perpendicular to the spin axis, whereby an output torque tending to deflect the gyroscope is generated by an instantaneous angular velocity of rotation about an input axis perpendicular to the spin and output axes, means for continuously resisting gyroscope deflections by torques substantially proportional to the rates of deflection and sufficiently large so that all other torques continually resisting gyroscope deflections are negligibly small with respect thereto, means for rotating the controlled member about the input axes of the gyroscopes, and means responsive to gyroscope deflections to activate said rotating means to move the controlled member to a position in which all the gyroscopes are substantially undeflected with respect to the controlled member, said activating means including angle resolving means to apply appropriate components of motion to the controlled member.

18. Gyroscopic apparatus comprising a controlled member, a plurality of gyroscopes, means for mounting said gyroscopes on the member, each with a single degree of freedom about an output axis perpendicular to the spin axis, whereby an output torque tending to deflect the gyro is generated by an instantaneous angular velocity of rotation about an input axis perpendicular to the spin and output axes, viscous damping means continuously resisting gyroscope deflections by torques such that all other torques continuously resisting gyroscope deflections are negligibly small with respect thereto, means for rotating the controlled member about the input axes of the gyroscopes, and means responsive to gyroscope deflections to activate said rotating means to move the controlled member to a position in which all the gyroscopes are substantially undeflected with respect to the controlled member, said activating means including angle resolving means to apply appropriate components of motion to the controlled member.

References Cited in the file of this patent
UNITED STATES PATENTS

| Number | Name | Date |
|---|---|---|
| 1,501,886 | Abbot | July 15, 1924 |
| 1,930,082 | Boykow | Oct. 10, 1933 |
| 1,940,387 | Boykow | Dec. 19, 1933 |
| 1,947,562 | Marmonier | Feb. 20, 1934 |
| 2,291,612 | Draper | Aug. 4, 1942 |
| 2,382,727 | Kronenberger | Aug. 14, 1945 |
| 2,488,734 | Mueller | Nov. 22, 1949 |
| 2,513,738 | Noxon | July 4, 1950 |
| 2,584,125 | Haglund | Feb. 5, 1952 |
| 2,592,417 | Hale | Apr. 8, 1952 |
| 2,631,455 | Wing | Mar. 17, 1953 |